United States Patent
Wu et al.

(10) Patent No.: US 10,877,577 B2
(45) Date of Patent: Dec. 29, 2020

(54) INPUT DEVICE FOR ELECTRONIC DEVICE AND INPUT SYSTEM

(71) Applicant: BOE TECHNOLOGY GROUP CO., LTD., Beijing (CN)

(72) Inventors: Naifu Wu, Beijing (CN); Wei Wei, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 16/198,994

(22) Filed: Nov. 23, 2018

(65) Prior Publication Data
US 2019/0302908 A1 Oct. 3, 2019

(30) Foreign Application Priority Data
Mar. 27, 2018 (CN) .......................... 2018 1 0260393

(51) Int. Cl.
G06F 3/0354 (2013.01)
G01L 1/16 (2006.01)
G06F 3/0346 (2013.01)
G06F 3/038 (2013.01)

(52) U.S. Cl.
CPC ............ *G06F 3/03545* (2013.01); *G01L 1/16* (2013.01); *G06F 3/0346* (2013.01); *G06F 3/0383* (2013.01)

(58) Field of Classification Search
CPC .. G06F 3/03545; G06F 3/0346; G06F 3/0383; G01L 1/16
See application file for complete search history.

(56) References Cited

U.S. PATENT DOCUMENTS

| | | | | |
|---|---|---|---|---|
| 2007/0267229 A1* | 11/2007 | Caritu | ................. | G06F 3/03545 178/19.01 |
| 2014/0192028 A1* | 7/2014 | Leydon | ............... | G06F 3/03545 345/179 |
| 2015/0363034 A1* | 12/2015 | Hinckley | .............. | G06F 3/0416 345/173 |
| 2016/0048224 A1* | 2/2016 | Brunet | ................ | G06F 3/03545 345/174 |
| 2017/0249022 A1* | 8/2017 | Coppin | ............... | G06F 3/03545 |
| 2019/0064936 A1* | 2/2019 | Wang | .................. | G06F 3/03545 |

FOREIGN PATENT DOCUMENTS

| | | |
|---|---|---|
| CN | 103339633 A | 10/2013 |
| CN | 103576900 A | 2/2014 |
| CN | 104156060 A | 11/2014 |
| CN | 205827343 U | 12/2016 |
| CN | 106383618 A | 2/2017 |
| CN | 107667333 A | 2/2018 |

OTHER PUBLICATIONS

First Office Action dated Aug. 20, 2020, for corresponding Chinese application 201810260393.8.

* cited by examiner

*Primary Examiner* — Stephen G Sherman
(74) *Attorney, Agent, or Firm* — Nath, Goldberg & Meyer; Joshua B. Goldberg

(57) ABSTRACT

The present disclosure discloses an input device for an electronic device and an input system. The input device includes: a body, a holding information acquiring component, and a style recognizing component, and the holding information acquiring component is disposed on the body and configured to acquire holding information of the user, and the style recognizing component is configured to determine a handwriting style according to the holding information.

18 Claims, 4 Drawing Sheets

INPUT DEVICE FOR ELECTRONIC DEVICE AND INPUT SYSTEM

CROSS-REFERENCE TO RELATED APPLICATIONS

The present application claims the priority to the Chinese Patent Application No. 201810260393.8, filed on Mar. 27, 2018, to the Chinese Intellectual Property Office, the contents of which are incorporated herein in their entirety by reference.

TECHNICAL FIELD

The present disclosure relates to the technical field of smart writing, and particularly relates to an input device for an electronic device and an input system.

BACKGROUND

A smart pen is a small-sized tool in shape of pen, which is used to input instruction to a device having a touch screen such as a computer screen, a mobile device, a drawing pad. A user can write or draw on the touch screen using the smart pen.

SUMMARY

The present disclosure provides an input device for an electronic device and an input system.

The input device includes a body; a holding information acquiring component, disposed on the body and configured to acquire holding information of a user; and a style recognizing component, configured to determine a handwriting style of the body from a plurality of handwriting styles based on the holding information.

In an embodiment, the holding information includes at least one of distribution information of contact points of the body when being held by the user, and inclination angle information of the body.

In an embodiment, when the holding information includes the distribution information of contact points of the body when being held by the user, the holding information acquiring component includes a pressure sensor, coated on a surface of a holding portion of the body and configured to acquire position information of the contact points on the holding portion where at least one finger of the user is pressed, and the position information of the contact points constitutes the distribution information of the contact points of the body when being held by the user, and when the holding information includes the inclination angle information of the body, the holding information acquiring component includes an inclination angle detecting portion, disposed on the body and configured to detect a writing angle between the body and a plane of the writing pad for writing with the body, as the inclination angle information of the body.

In an embodiment, the plane of the writing pad is perpendicular to gravity direction, and the inclination angle detecting portion includes an inclination angle sensor, disposed inside the body and configured to acquire an inclination angle α of the body relative to the gravity direction; and a first computing sub-portion, configured to determine the writing angle θ according to the inclination angle α, and θ=90°−α.

In an embodiment, the inclination angle detecting portion includes a distance sensor, disposed on an end of the body and configured to detect a distance H between the end of the body and the writing pad; and a second computing sub-portion, configured to determine the writing angle θ according to the distance H between the end of the body and the writing pad, $$\theta = \arcsin\frac{H}{L},$$

and L is a length of the body.

In an embodiment, the style recognizing component includes a model storing portion, having a classification model stored therein previously, the classification model includes a plurality of classifiers, each of which corresponds to a handwriting style from the plurality of handwriting styles; and a data processing portion, configured to classify the holding information into a resultant classifier using the classification model to determine the handwriting style corresponding to the holding information.

In an embodiment, the style recognizing component further includes a sample storing portion, having sample sets for training the plurality of classifiers and configured to store the holding information into a sample set for training the resultant classifier after the data processing portion determines the handwriting style corresponding to the holding information; and a model training portion, configured to train the plurality of classifiers according to the sample sets in the sample storing portion to update the classification model.

In an embodiment, the handwriting style includes a chalk handwriting style, a pen handwriting style, or a Chinese brush handwriting style.

In an embodiment, the handwriting style is recognized by at least one of distribution information of contact points of the body when being held by the user sensed by the pressure sensor, and inclination angle information detected by the inclination angle detecting portion.

In an embodiment, each of the plurality of classifiers computes a classification score for the holding information, and selects the handwriting style corresponding to a classifier with a highest classification score as a classification result to be output.

In an embodiment, the user writes in the chalk handwriting style, an end portion of a thumb, an end portion of a forefinger, an end portion of a middle finger, and an end portion of a ring finger are in contact with a first half of the body, a bottom portion of a palm is in contact with a second half of the body, a number of contact points sensed by the pressure sensor is five, with four contact points corresponding to the end portion of the thumb, the end portion of the forefinger, the end portion of the middle finger, and the end portion of the ring finger being close to each other, while one contact point corresponding to the bottom portion of the palm being away from the four contact points.

In an embodiment, the user writes in the chalk handwriting style, and the inclination angle is larger than 60°, and the writing angle is smaller than 30°.

In an embodiment, the user writes in the pen handwriting style, an end portion of a thumb, an end portion of a forefinger, and a second section of a middle finger are in contact with a first half of the body, a jaws of death portion between the thumb and the forefinger is in contact with a second half of the body, a number of contact points sensed by the pressure sensor is four, with three contact points corresponding to the end portion of the thumb, the end portion of the forefinger, and the second section of the middle finger being close to each other, while the contact point corresponding to the jaws of death portion being away from the three contact points.

In an embodiment, the user writes in the pen handwriting style, the inclination angle ranges from 15° to 60°, and a writing angle ranges from 30° to 75°.

In an embodiment, the user writes in Chinese brush handwriting style, an end portion of a middle finger and an end portion of a ring finger are in contact with a first half of the body, a first section of a forefinger and an end portion of a thumb are in contact with the first half of the body, a number of contact points sensed by the pressure sensor is four, with two contact points corresponding to the end portion of the middle finger, and the end portion of the ring finger being close to each other, and two contact points corresponding to the first section of the forefinger and the end portion of the thumb being close to each other.

In an embodiment, the user writes in the Chinese brush handwriting style, the inclination angle ranges from 0° to 10°, and a writing angle θ between the body and a plane of a writing pad ranges from 80° to 90°.

In an embodiment, the input device further includes: a piezoelectric contact, disposed on a tip of the body, configured to acquire a pressure applied thereto, and convert the pressure into an electric signal; and a first control signal generating component, configured to generate a first control signal according to the electric signal, for determination of a width of handwriting to be displayed by an external display device according to the first control signal.

In an embodiment, the input device further includes a second control signal generating component, configured to generate a second control signal according to a handwriting style determined by the style recognizing component, for display of handwriting corresponding to the handwriting style by the external display device according to the second control signal.

The input system includes an electronic device including: a display; and an input device, including: a body; a holding information acquiring component, disposed on the body and configured to acquire holding information of a user; and a style recognizing component, configured to determine a handwriting style of the body from a plurality of handwriting styles based on the holding information, and the display is configured to display a character written by the user according the handwriting style determined by the input device.

DETAILED DESCRIPTION

For better understanding of the technical solution of the present disclosure by those skilled in the art, the specific implementations of the present disclosure will be described in detail below in conjunction with the drawings.

In order to adapt to different writing scenarios, a selection menu is generally set on a writing pad when a writing or drawing operation is performed on the writing pad with a smart pen. The selection menu is provided with buttons corresponding to different handwriting styles (for example, the Chinese brush handwriting style, the pen handwriting style, and the chalk handwriting style). For example, when the Chinese brush handwriting style is desired, the user can select the "Chinese brush" button in the menu and then write on the writing pad. In this case, the display screen can display handwritings in the Chinese brush handwriting style.

It can be seen that, the handwriting style of the smart pen is generally determined by a manual selection of menu buttons at present, which is not intelligent.

Figure 1:
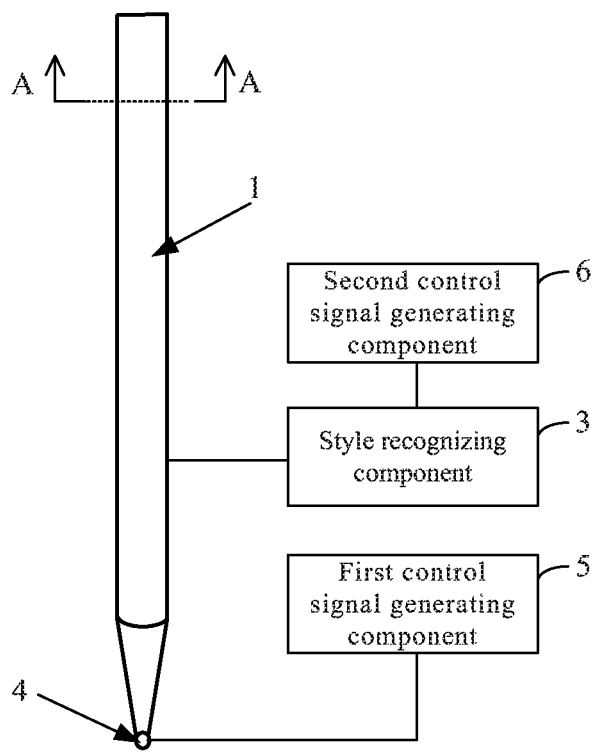
FIG. 1 is a schematic structural diagram of an input device provided by an embodiment of the present disclosure.
Figure 2:
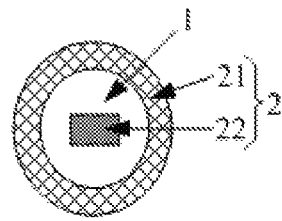
FIG. 2 is a sectional view of the input device in FIG. 1 along the A-A direction.

FIG. 1 is the schematic structural diagram of the input device provided by an embodiment of the present disclosure. FIG. 2 is the sectional schematic diagram of the input device in FIG. 1 along the A-A direction. As shown in FIG. 1 and FIG. 2, the input device includes: a body 1, a holding information acquiring component 2, and a style recognizing component 3. The body is configured for holding and writing by the user. The holding information acquiring component 2 is disposed on the body, and configured to acquire the holding information of the user. The style recognizing component 3 is configured to determine the handwriting style of the body 1 according to the holding information.

Specifically, the input device in the present disclosure may be a smart pen. Specifically, the handwriting style of the body in the disclosure may refer to a style of handwriting written with the body when the body is used by the user. In general, the styles of handwriting may include: the chalk handwriting style, the pen handwriting style, and the Chinese brush handwriting style (collectively referred to as "the three handwriting styles"). The handwriting styles in the present disclosure can be at least one of the chalk handwriting style, the pen handwriting style, and the Chinese brush handwriting style. In the following description, the technical solution will be described with embodiments by taking the chalk handwriting style, the pen handwriting style, and the Chinese brush handwriting style as examples respectively. That is to say, the body can be used in a manner as any one of a chalk, a pen and a Chinese brush.

Additionally, the writing pad used for writing with the smart pen and the display device configured for display of the handwriting can be independent structures (for example, the writing pad may be in cooperation with the display device). Alternatively, they can be in an integrated structure (for example, a display screen with a function of touch recognition). The present disclosure is not limited thereto.

The style recognizing component 3 can be disposed in the body 1 (not shown), and can be disposed outside the body 1 (as shown in FIG. 1, for example, being disposed on the touch screen in cooperation with the body 1). The style recognizing component 3 can be in data communication with the holding information acquiring component 2 in a wired or a wireless manner. Specifically, the style recognizing component 3 may be a data processing chip.

The present disclosure takes into account that the user is in a different holding gesture when writing in a different handwriting style, leading to different holding information. By acquiring the holding information when the user holds the body, which type of pen that the body 1 is used as by the user can be determined, the handwriting style desired by the user can be determined. It can be seen from the above content that, the technical solution of the present disclosure can automatically determine the handwriting style of the body 1 according to the holding information of the user without a manual selection operation. Compared to the related art, the technical solution of the present disclosure is more intelligent.

In an embodiment, the holding information includes: distribution information of contact points of the body when being held by a user, and the inclination angle information of the body. The holding information acquiring component 2 includes: a pressure sensor 21, and an inclination angle detecting portion 22. The pressure sensor 21 is coated on a surface of a holding portion of the body 1, configured to acquire the position information of each contact point on the holding portion where the finger of the user is pressed on. The position information of all contact points constitutes the distribution information of the pen when being held (which includes the number of contact points, and position information of each contact point). The inclination angle detecting portion 22 is disposed on the body, and configured to detect a writing angle between the body 1 and a plane of the writing pad used for writing with the body 1, as the inclination angle information of the body.

Exemplary description is provided below with the condition that the plane of the writing pad is perpendicular to the gravity direction. For sake of description, the body 1 is divided into two parts: a first half 11 (i.e. a part proximal to a tip of the body) and a second half 12 (i.e. a part distal to the tip of the body). The first half 11 relates to a portion of the body 1 including a writing end, and the second half 12 relates to a portion of the body including an end part opposite to the writing end.

Figure 3A:
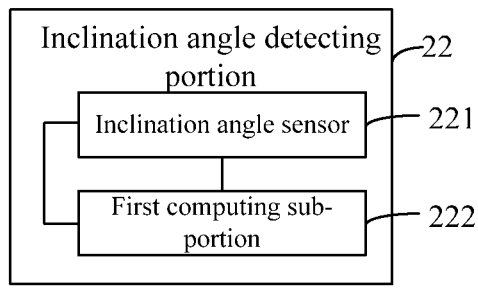
FIG. 3A is a schematic structural diagram of an inclination detecting portion according to an embodiment of the present disclosure.

As shown in FIG. 3A, the inclination angle detecting portion 22 may include: an inclination angel sensor 221, and a first computing sub-portion 222. The inclination angle sensor 221 is disposed inside the body, and configured to acquire the inclination angle α of the body relative to the gravity direction. The first computing sub-portion is configured to determine the writing angle θ according to the inclination angle α, and θ=90°−α.

Figure 4A:
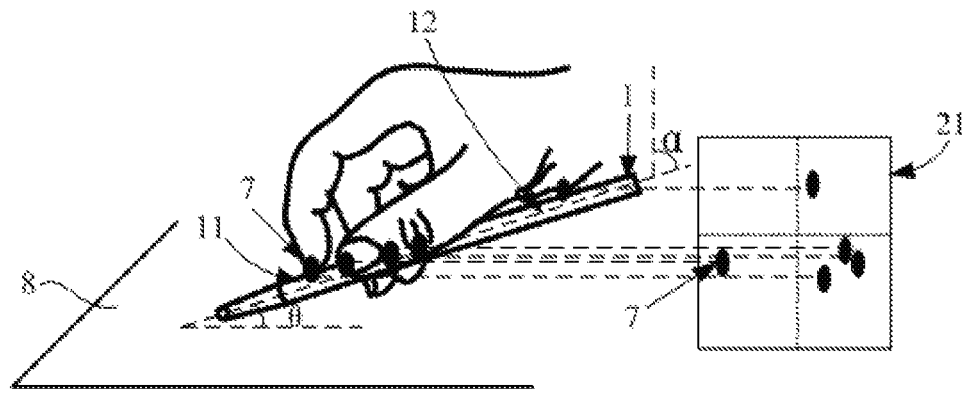
FIG. 4A is a schematic diagram illustrating a holding gesture of a user when he is writing in a chalk handwriting style.

FIG. 4A is the schematic diagram showing the holding gesture of the user when writing in the chalk handwriting style. As shown in FIG. 4A, when writing in the chalk handwriting style, the end portion of the thumb, the end portion of the forefinger, the end portion of the middle finger, and the end portion of the ring finger are in contact with the first half 11 of the body 1. The bottom portion of the palm, which is proximal to the arm, is in contact with the second half 12 of the body 1. The number of contact points 7 which may be sensed by the pressure sensor 21 is 5. Four contact points 7 corresponding to end portions of four fingers are relatively close to each other, and the contact point 7 corresponding to the bottom portion of the palm is relatively away from the other four contact points. Meanwhile, the inclination angle α of the body 1 relative to the gravity direction sensed by the inclination sensor (not shown) is relatively large (generally larger than 60°. Accordingly, the writing angle of the body 1 relative to the plane of the writing pad 8 computed by the first computing sub-portion is relatively small (generally smaller than 30°).

It should be noted that, the inclination angle sensor may be a conventional sensor, and a specific structure and working principle thereof will not be described in detail below.

Figure 4B:
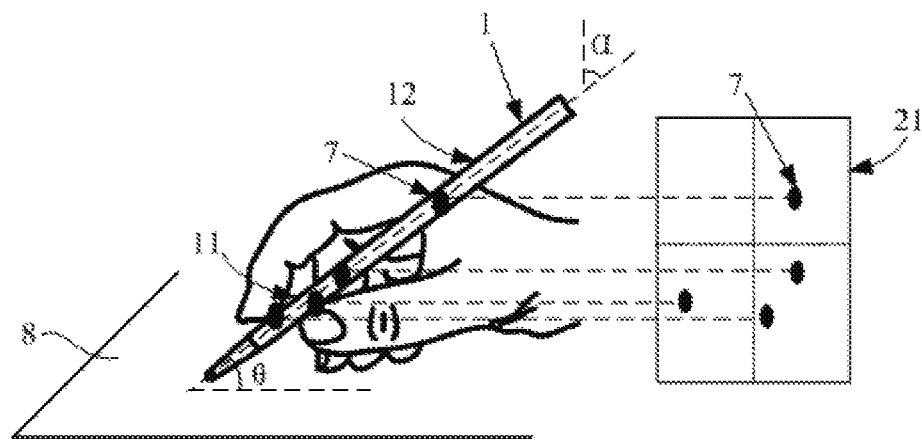
FIG. 4B is a schematic diagram illustrating a holding gesture of a user when he is writing in a pen handwriting style.

FIG. 4B is the schematic diagram showing the holding gesture of the user when writing in the pen handwriting style. As shown in FIG. 4B, when writing in the pen handwriting style, the end portion of the thumb, the end portion of the forefinger, and the second portion of the middle finger are in contact with the first half 11 of the body 1. The jaws of death portion between the thumb and the forefinger is in contact with the second half 12 of the body 1. The number of contact points which may be sensed by the pressure sensor 21 is four. Three contact points 7 corresponding to the end portion of the thumb, the end portion of the forefinger, and the second section of the middle finger are relatively close to each other. The contact point 7 corresponding to the jaws of death portion is relatively away from the other three contact points. Meanwhile, the inclination angle α of the body 1 corresponding to the gravity direction sensed by the inclination angle sensor is moderate, generally between 15° and 60°. Accordingly, the writing angle θ of the body 1 corresponding to the plane of the writing pad 8, which is computed by the first computing sub-portion, is moderate, generally between 30° and 75°.

Figure 4C:
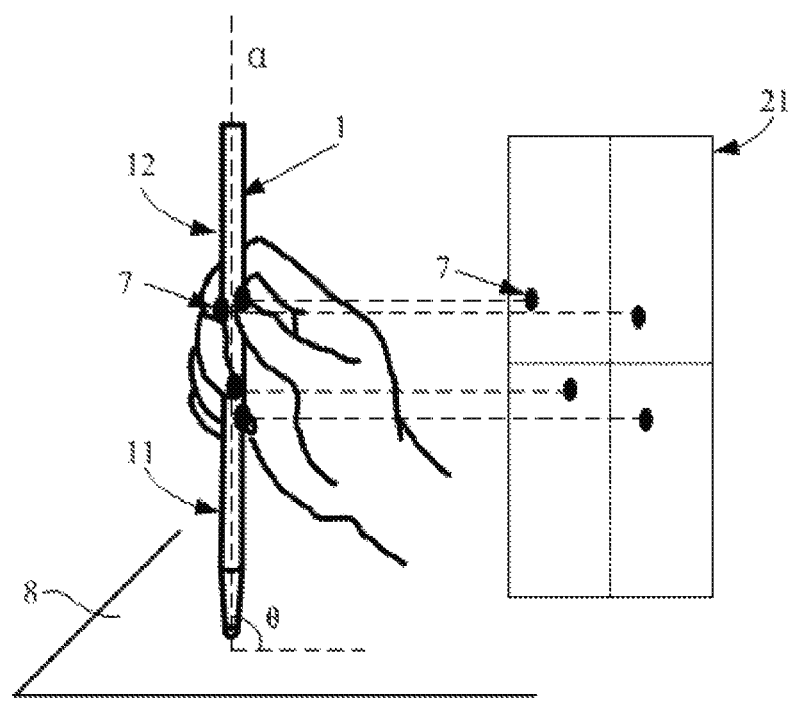
FIG. 4C is a schematic diagram illustrating a holding gesture of a user when he is writing in a Chinese brush handwriting style.

FIG. 4C is the schematic diagram showing the holding gesture of the user when writing in the Chinese brush handwriting style. As shown in FIG. 4C, when writing in the Chinese brush handwriting style, the end portion of the middle finger, and the end portion of the ring finger are in contact with the first half 11. The first section of the forefinger and the end portion of the thumb are in contact with the first half. The number of contact points 7 which may be sensed by the pressure sensor 21 is four. Two contact points 7 corresponding to the end portion of the middle finger and the end portion of the ring finger are relatively close to each other, and two contact points corresponding to the first section of the forefinger and the end portion of the thumb are relatively close to each other. Meanwhile, the inclination angle α of the body 1 relative to the gravity direction sensed by the inclination angle sensor is relatively small, generally between 0° and 10°. The writing angle θ between the body 1 and the plane of the writing pad 8, which is computed by the first computing sub-portion, is relatively large, generally between 80° and 90°.

It can be seen, the user is in different pen holding gestures when writing in different handwriting styles. That is, both of the distribution information of contact points of the body when being held by a user detected by the pressure sensor 21, and the inclination angle information detected by the inclination angle detecting portion 22 are different when the user writes in different handwriting styles. Thus, the style recognizing component 3 can recognize the handwriting style corresponding to the body 1 according the distribution information of contact points of the body when being held by a user detected by the pressure sensor 21, and/or the inclination angle information detected by the inclination angle detecting portion 22.

It should be noted that, the holding information includes both the distribution information of the contact points of the body when being held by a user and the inclination angle information of the body is an embodiment of the present disclosure. In this case, recognition accuracy may be effectively increased by considering both the factor of the distribution information of contact points of the body when being held by a user and the factor of the inclination angle of the body. Of course, in the present disclosure, the recognition may be implemented merely based on the distribution information of the contact points of the body when being held by a user (in this case, the holding information acquiring component 2 may include the pressure sensor 21, and not include the inclination angle detecting portion 22), and may also be implemented merely based on the inclination angle information of the body (in this case, the holding information acquiring component 2 may include the inclination angle detecting portion 22, and not include the pressure sensor 21).

Figure 3B:
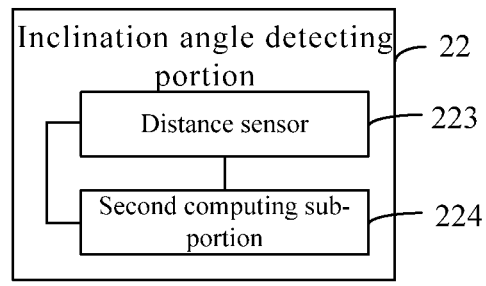
FIG. 3B is a schematic structural diagram of an inclination detecting portion according to an embodiment of the present disclosure.
Figure 5:
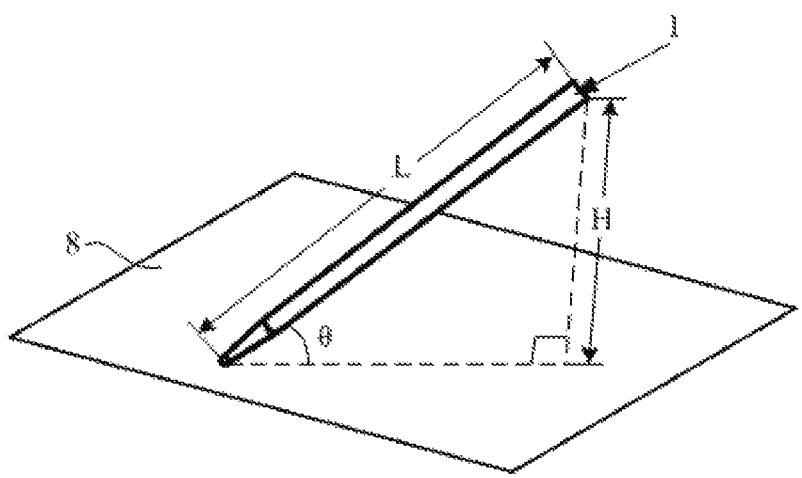
FIG. 5 is a schematic diagram showing how to detect a writing angle based on a distance sensor.

In order to enhance the generality of the input device, as shown in FIG. 3B, as an embodiment, the inclination angle detecting portion 22 may include: a distance sensor 223, and a second computing sub-portion 224. FIG. 5 is a schematic diagram showing how to detect a writing angle based on the distance sensor. As shown in FIG. 5, the distance sensor is disposed on an end of the body 1, and configured to detect a distance H between the end of the body 1 and the writing pad 8. The second computing sub-portion is configured to determine the writing angle θ according to the distance H between the end of the body 1 and the writing pad 8. Herein, $$\theta = \arcsin\frac{H}{L},$$

and L is a length of the body.

In the present disclosure, when using the distance sensor and the second computing sub-portion to detect the writing angle between the body 1 and the writing pad 8, there is no limit to the manner in which the writing pad 8 is placed. That is to say, the writing pad 8 may be placed horizontally, vertically or obliquely. Thus, this solution is more general.

Figure 6:
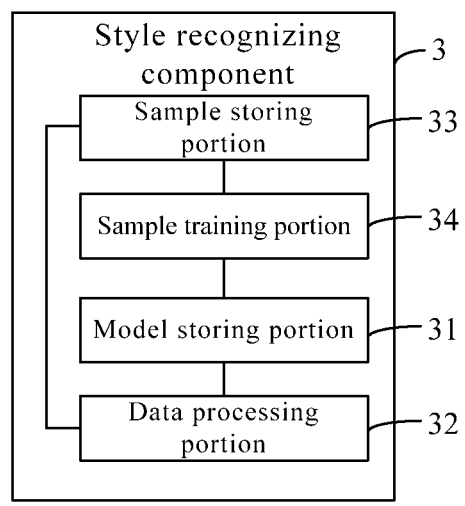
FIG. 6 is a schematic structural diagram of a style recognizing component according to an embodiment of the present disclosure.

FIG. 6 is a schematic structural diagram of the style recognizing component according to the present disclosure. As shown in FIG. 6, in an embodiment, the style recognizing component 3 may include a model storing portion 31, and a data processing portion 32. The model storing portion 31 has a classification model stored therein previously. The classification model may include: a plurality of classifiers, each of which corresponds to a handwriting style, respectively. The data processing portion 32 is configured to classify the holding information using classifiers stored in the model storing portion, in order to determine the current handwriting style corresponding to the body 1.

In the present disclosure, for each handwriting style, a classifier can be trained according to sample data previously collected. After completion of the training, each classifier computes a classification score for holding information collected by the holding information acquiring component 2. The classification score indicates the probability of the holding information belonging to a corresponding style (a higher classification score indicates the higher probability that the holding information belongs to the style). Then, the handwriting style corresponding to the classifier with the highest score is selected as the classification result to be output.

It should be noted that, the style recognizing component 3 being used to determine the handwriting style corresponding to the body 1 based on the classifier is an embodiment of the present disclosure, and the present disclosure is not limited thereto. In the present disclosure, other algorithms can be used for processing the holding information to determine the handwriting style of the body 1. It should be appreciated by those skilled in the art that, all technical solutions for determining the handwriting style corresponding to the body 1 based on the holding information belong to the scope of the present disclosure.

In an embodiment, the style recognizing component 3 may further include: a sample storing portion 33 and a model training portion 34. The sample storing portion 33, having sample sets for training all classifiers stored therein, is configured to store the holding information into the sample set of the classifier corresponding to the classification result, after the data processing portion 32 determines the handwriting style corresponding to the holding information. The model training portion 34 is configured to train corresponding classifiers according to sample sets in the sample storing portion 33, in order to update the classification model in the model storing portion 31.

In the present disclosure, as the usage time of the user increases, the holding information, collected during writing in different handwriting styles and later stored in respective sample sets, gets more, the accuracy of the trained classification model for classifying the holding information of the user gets higher, thus customization can be achieved.

As shown in FIG. 1, in an embodiment, the input device further includes: a piezoelectric contact 4 and a first control signal generating component 5. The piezoelectric contact 4 is disposed on a tip of the body 1, configured to acquire the pressure applied thereto, and to convert the pressure into a corresponding electric signal. The first control signal generating component 5 is used to generate a corresponding first control signal according to the electric signal, in order that a width of the handwriting to be displayed is determined by an external display device according to the first control signal. For example, when the piezoelectric contact 4 is subject to a relative higher pressure, its output electric signal is larger. Then, the first control signal generating component outputs the first control signal corresponding to the electric signal by a look-up table, and the external display device displays the handwriting with a larger width. That is, for the same handwriting style, the larger the pressure the piezoelectric contact sensed, the larger the width of handwriting displayed by the external display device.

In the present disclosure, with the piezoelectric contact 4 and the first control signal generating component 5, the width of the handwriting to be displayed may be automatically controlled according to the pressure applied to the piezoelectric contact 4, so that the writing device is more intelligent. It should be noted that, the first control signal generating component 5 may be in data transmission with the piezoelectric contact in wired or wireless manner.

In an embodiment, the input device may further include: a second control signal generating component 6. The second control signal generating component 6 is configured to generate a corresponding second control signal according the handwriting style determined by the style recognizing component 3, so that the external display device may display the handwriting corresponding to the handwriting style according to the second control signal.

It should be noted that, the first control signal generating component 5 and the second control signal generating component 6 may be integrated into the body 1 (not shown), and may also be disposed external to the body 1 (as shown in FIG. 1).

The embodiment of the present disclosure provides an input device, including: a body, a holding information acquiring component, and a style recognizing component. The body is configured for holding and writing by the user, the holding information acquiring component is disposed on the body, and configured to acquire the holding information of the user, and the style recognizing component is configured to determine the handwriting style of the body according to the holding information. In the present disclosure, the handwriting style of the body is automatically determined according the holding information of the user, without a manual selection operation by the user, and thus the input device is more intelligent.

Figure 7:
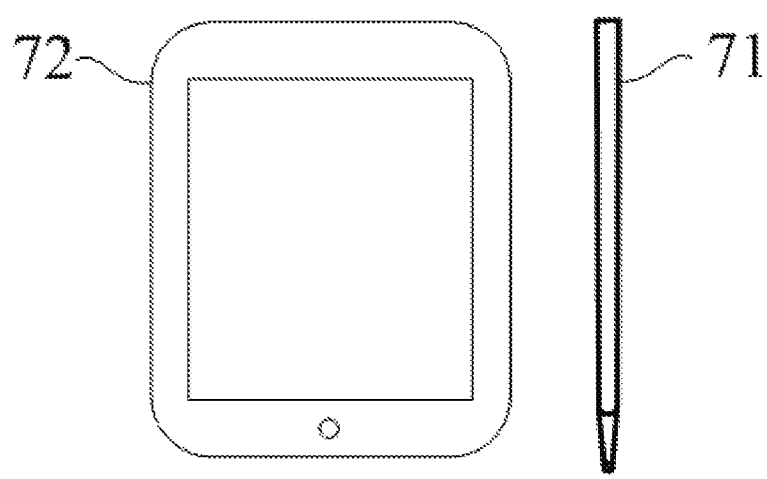
FIG. 7 is a schematic diagram of a structure of an input system.

As shown in FIG. 7, an embodiment of the present disclosure further provides an input system, including: an input device 71, and the input device 71 is the input device in the above embodiments. The description about the input device 71 can be referred to the above embodiments, and will not be described hereafter.

In addition to the input device 71, the input system provided in an embodiment of the present disclosure further includes a display 72. The display 72 is configured to display characters written by the user according the handwriting style determined by the input device.

A flowchart or a block diagram in the drawings illustrates an architecture, a function, and an operation which could be achieved with a system, a method, and a computer program product of the present disclosure. Each block in a flowchart or a block diagram may represent a portion or component or module or unit, a program segment, or a part of code that contains at least one executable instruction for achieving a specified logic function. It should also be noted that in an alternative embodiment, the function noted in the block may also occur in an order different from the order shown in the drawings. For example, two blocks represented sequentially could actually be executed substantially in parallel, or they could sometimes be executed in the opposite order, depending on the function involved. It should also be noted that each block in the block diagram and/or flowchart, as well as a combination of blocks in the block diagram and/or flowchart, could be achieved with a dedicated hardware-based system that performs a specified function or operation, or could be achieved with a combination of a dedicated hardware and computer instructions.

A portion, a sub-portion or a component involved in the embodiments of the present disclosure may be implemented by software or hardware. The portion or component may also be installed in a processor, for example, the portion may be software programs installed in a computer or mobile intelligent device, or may be a hardware device configured separately. A name of the portion or component should not be interpreted as a limitation to the portion or component.

It should be understood that, the above embodiments are merely exemplary embodiments for the purpose of explaining the principle of the present disclosure, and the present disclosure is not limited thereto. For one of ordinary skill in the art, various improvements and modifications may be made without departing from the spirit and essence of the present disclosure. These improvements and modifications also considered as being within the protection scope of the present disclosure.

What is claimed is:

1. An input device for an electronic device, comprising:
   a body;
   a holding information acquiring component, disposed on the body and configured to acquire holding information of a user; and
   a style recognizing component, configured to determine a handwriting style of the body from a plurality of handwriting styles based on the holding information,
   wherein the holding information comprises distribution information of contact points of the body when being held by the user, and inclination angle information of the body, wherein
   when the holding information comprises the distribution information of contact points of the body when being held by the user, the holding information acquiring component comprises a pressure sensor, coated on a surface of a holding portion of the body and configured to acquire position information of the contact points on the holding portion where at least one finger of the user is pressed, and the position information of the contact points constitutes the distribution information of the contact points of the body when being held by the user, and
   when the holding information comprises the inclination angle information of the body, the holding information acquiring component comprises an inclination angle detecting portion, disposed on the body and configured to detect a writing angle between the body and a plane of the writing pad for writing with the body, as the inclination angle information of the body; and
   wherein the inclination angle detecting portion comprises:
   a distance sensor, disposed on an end of the body and configured to detect a distance H between the end of the body and the writing pad; and
   a second computing sub-portion, configured to determine the writing angle θ according to the distance H between the end of the body and the writing pad, wherein, $$\theta = \arcsin\frac{H}{L},$$

and L is a length of the body.

2. The input device according to claim 1, wherein the plane of the writing pad is perpendicular to gravity direction, and
   the inclination angle detecting portion comprises an inclination angle sensor, disposed inside the body and configured to acquire an inclination angle α of the body relative to the gravity direction; and a first computing sub-portion, configured to determine the writing angle θ according to the inclination angle α, wherein θ=90°−α.

3. The input device according to claim 1, wherein the style recognizing component comprises:
   a model storing portion, having a classification model stored therein previously, wherein the classification model comprises a plurality of classifiers, each of which corresponds to a handwriting style from the plurality of handwriting styles; and
   a data processing portion, configured to classify the holding information into a resultant classifier using the classification model to determine the handwriting style corresponding to the holding information.

4. The input device according to claim 3, wherein the style recognizing component further comprises:
   a sample storing portion, having sample sets for training the plurality of classifiers and configured to store the holding information into a sample set for training the resultant classifier after the data processing portion determines the handwriting style corresponding to the holding information; and a model training portion, configured to train the plurality of classifiers according to the sample sets in the sample storing portion to update the classification model.

5. The input device according to claim 4, wherein the handwriting style comprises a chalk handwriting style, a pen handwriting style, or a Chinese brush handwriting style.

6. The input device according to claim 5, wherein the handwriting style is recognized by at least one of distribution information of contact points of the body when being held by the user sensed by the pressure sensor, and inclination angle information detected by the inclination angle detecting portion.

7. The input device according to claim 6, wherein each of the plurality of classifiers computes a classification score for the holding information, and select the handwriting style corresponding to a classifier with a highest classification score as a classification result to be output.

8. The input device according to claim 7, wherein the user writes in the chalk handwriting style, an end portion of a thumb, an end portion of a forefinger, an end portion of a middle finger, and an end portion of a ring finger are in contact with a first half of the body, a bottom portion of a palm is in contact with a second half of the body, a number of contact points sensed by the pressure sensor is five, with four contact points corresponding to the end portion of the thumb, the end portion of the forefinger, the end portion of the middle finger, and the end portion of the ring finger being close to each other, while one contact point corresponding to the bottom portion of the palm being away from the four contact points.

9. The input device according to claim 7, wherein the user writes in the chalk handwriting style, and the inclination angle is larger than 60°, and the writing angle is smaller than 30°.

10. The input device according to claim 7, wherein the user writes in the pen handwriting style, an end portion of a thumb, an end portion of a forefinger, and a second section of a middle finger are in contact with a first half of the body, a jaws of death portion between the thumb and the forefinger is in contact with a second half of the body, a number of contact points sensed by the pressure sensor is four, with three contact points corresponding to the end portion of the thumb, the end portion of the forefinger, and the second section of the middle finger being close to each other, while the contact point corresponding to the jaws of death portion being away from the three contact points.

11. The input device according to claim 7, wherein the user writes in the pen handwriting style, the inclination angle ranges from 15° to 60°, and a writing angle ranges from 30° to 75°.

12. The input device according to claim 7, wherein the user writes in Chinese brush handwriting style, an end portion of a middle finger and an end portion of a ring finger are in contact with a first half of the body, a first section of a forefinger and an end portion of a thumb are in contact with the first half of the body, a number of contact points sensed by the pressure sensor is four, with two contact points corresponding to the end portion of the middle finger, and the end portion of the ring finger being close to each other, and two contact points corresponding to the first section of the forefinger and the end portion of the thumb being close to each other.

13. The input device according to claim 7, wherein the user writes in the Chinese brush handwriting style, the inclination angle ranges from 0° to 10°, and a writing angle θ between the body and a plane of a writing pad ranges from 80° to 90°.

14. The input device according to claim 1, further comprising:

a piezoelectric contact, disposed on a tip of the body, configured to acquire a pressure applied thereto, and convert the pressure into an electric signal.

15. An input system, comprising:
an electronic device comprising:
a display; and
an input device, comprising:
a body;
a holding information acquiring component, disposed on the body and configured to acquire holding information of a user; and
a style recognizing component, configured to determine a handwriting style of the body from a plurality of handwriting styles based on the holding information,
wherein the display is configured to display a character written by the user according the handwriting style determined by the input device, and
the holding information comprises distribution information of contact points of the body when being held by the user, and inclination angle information of the body, wherein
when the holding information comprises the distribution information of contact points of the body when being held by the user, the holding information acquiring component comprises a pressure sensor, coated on a surface of a holding portion of the body and configured to acquire position information of the contact points on the holding portion where at least one finger of the user is pressed, and the position information of the contact points constitutes the distribution information of the contact points of the body when being held by the user, and
when the holding information comprises the inclination angle information of the body, the holding information acquiring component comprises an inclination angle detecting portion, disposed on the body and configured to detect a writing angle between the body and a plane of the writing pad for writing with the body, as the inclination angle information of the body; and
wherein the inclination angle detecting portion comprises:
a distance sensor, disposed on an end of the body and configured to detect a distance H between the end of the body and the writing pad; and
a second computing sub-portion, configured to determine the writing angle θ according to the distance H between the end of the body and the writing pad, wherein, $$\theta = \arcsin\frac{H}{L},$$

and L is a length of the body.

16. An input device for an electronic device, comprising:
a body;
a holding information acquiring component, disposed on the body and configured to acquire holding information of a user; and
a style recognizing component, configured to determine a handwriting style of the body from a plurality of handwriting styles based on the holding information, wherein the holding information comprises inclination angle information of the body, the holding information acquiring component comprises an inclination angle detecting portion, disposed on the body and configured to detect a writing angle between the body and a plane of the writing pad for writing with the body, as the inclination angle information of the body, wherein the inclination angle detecting portion comprises:

a distance sensor, disposed on an end of the body and configured to detect a distance H between the end of the body and the writing pad; and a second computing sub-portion, configured to determine the writing angle θ according to the distance H between the end of the body and the writing pad, wherein, $$\theta = \arcsin\frac{H}{L},$$

and L is a length of the body.

17. The input device according to claim 16, wherein the style recognizing component comprises:

a model storing portion, having a classification model stored therein previously, wherein the classification model comprises a plurality of classifiers, each of which corresponds to a handwriting style from the plurality of handwriting styles; and a data processing portion, configured to classify the holding information into a resultant classifier using the classification model to determine the handwriting style corresponding to the holding information.

18. The input device according to claim 17, wherein the style recognizing component further comprises:

a sample storing portion, having sample sets for training the plurality of classifiers and configured to store the holding information into a sample set for training the resultant classifier after the data processing portion determines the handwriting style corresponding to the holding information; and a model training portion, configured to train the plurality of classifiers according to the sample sets in the sample storing portion to update the classification model.

* * * * *